Patented Dec. 10, 1940

2,224,516

UNITED STATES PATENT OFFICE 2,224,516

PROCESS FOR THE PRODUCTION OF LUMINOUS ENAMEL

Walter Kerstan and Heinrich Diehl, Frankfort-on-the-Main, and Wilhelm Deseke, Berlin, Germany, assignors to Auergesellschaft Aktiengesellschaft, Berlin, Germany, a corporation of Germany No Drawing. Application July 27, 1938, Serial No. 221,600. In Germany July 30, 1937

8 Claims. (Cl. 250—81)

The invention relates to the production of luminous or "glow" enamel made out of luminous sulfide base pigments and out of frits which are suitable for producing enamels.

Luminous pigments of the above described composition, especially those which contain zinc sulfide and which may be activated by slight amounts of copper, are very sensitive towards atmospheric conditions, thus limiting their application as decomposition takes place in a short time which lessens their glowing power considerably. Especially in the presence of moisture the direct influence of sun-light is very harmful which results in darkening of their color and loss of glowing power.

Experiments have shown that by inserting the luminous pigments into the enamel these difficulties could not be overcome, as the luminous power of such enamels always used to be less than that of the luminous pigment itself.

The present invention provides, as a new article of manufacture, a luminous enamel that can be exposed to all atmospheric agents without losing its qualities and efficiency of luminousness in the direct exposure to sunlight and moisture.

In producing these luminous enamels several conditions have to be observed.

The first condition which was discovered consists in using low melting frits for the luminous enamel with a melting point below 850° C., advantageously those frits which melt between 575°–700° C. These low melting frits may be obtained by employing a higher content of the usual fluxes known in the ceramic art, such as compounds of alkali- and earth-alkali metals, for instance alkali metal oxide and the like, preferably a mixture of them; further useful fluxes are boric acid, alkali borates and the like. The melting point may be considerably lowered by using lithium oxide in the presence of other alkali metal compounds. Frits containing lithium have the great advantage of possessing a higher weather resistance than those without lithium. Also the presence of zinc oxide has proved to be of great advantage for lowering the melting point and at the same time for preserving the power of phosphorescence and of luminousness of the enamels.

The second condition which has to be observed consists in possibly avoiding the coloring heavy metals, such as iron, nickel, cobalt, etc., since the great disadvantage of their presence in the enamel towards decreasing the power of luminousness has been discovered. Likewise all fluxes containing lead must strictly be avoided, as lead shows the same disagreeable effect as the coloring metals mentioned above. The content of such heavy metals in the frits should not exceed 0.05% of weight, preferably 0.01%, corresponding to the amount of the frit. Consequently pure raw materials which do not contain these heavy metals as impurities must be used in manufacturing luminous enamels according to the present invention. Besides these precautions one must also observe that in the process of making these "glow" enamels no harmful impurities should enter the frits. For this reason care must be taken to employ the right kind of apparatus and implements, such as mills and crucibles, which cannot give off disadvantageous quantities of harmful heavy metals to the frits.

It is of advantage to grind the frit in the absence of the luminous pigment and to add the latter after grinding the frit, since by a joint grinding of both ingredients, the frit and the luminous pigment, the quality of phosphorescence is decreased. Furthermore it is of advantage to add the luminous pigments to the ground frit in the state of a fine distribution, preferably in the range of the size which is given by the fineness of grain of the ground frit.

The addition of the luminous pigment causes certain effects of turbidity in the enamel. But in addition, other substances which cause opacity like tin oxide, may be added, but the quantity of these ingredients should be less than the quantity usually employed. As further ingredients small quantities of flocculating agents (Stellmittel) may be added, which advantageously are introduced during the process of mixing the luminous color with the frit. The addition of flocculating agents has the advantage that the enamels are able to be laid on directly, thus avoiding the usual wet grinding with clay before enamelling.

A luminous pigment known under the trade name of "Clarophan" for instance may be used as such.

The following frit may be used according to the invention:

| | Mols. |
|---|---|
| Alkali oxide, preferably 0.10–0.25 mol. $LiO_2$ | 0.03–0.5 |
| Earth alkali oxide | 0.05–0.25 |
| ZnO | 0.35–0.60 |
| $Al_2O_3$ | 0 –0.1 |
| $SiO_2$ | 0.25–1.0 |
| $F_2$ | 0 –0.2 |
| $B_2O_3$ | 0.15–1.2 |

In carrying out the invention, for example, the frit may be melted in a covered crucible of porcelain, finely ground in a hard porcelain mill and then intimately mixed with approximately 25-50%, preferably 35-45% of weight of a luminous sulfide base pigment, which grade of fineness corresponds to that of the frit, whereupon small quantities of the usual flocculating agents may be added.

What we claim is:

1. A composition for the production of a luminous enamel comprising a luminous sulfide base pigment and a frit having a melting point not exceeding 850° C. and which is substantially free of iron, nickel, cobalt and lead.

2. A composition for the production of a luminous enamel comprising a luminous sulfide base pigment and a frit having a melting point between 575° C. and 700° C. and which is substantially free of iron, nickel, cobalt and lead.

3. A composition for the production of a luminous enamel comprising a luminous sulfide base pigment and a frit containing fluxes in quantities sufficient to bring the melting point of the frit below 850° C. and which is substantially free of iron, nickel, cobalt and lead.

4. A composition for producing a luminous enamel comprising a luminous sulfide base pigment and a frit containing an alkali metal compound and lithium oxide in a quantity sufficient to bring the melting point of the frit between 575° C. and 850° C. and which is substantially free of iron, nickel, cobalt and lead.

5. A composition for producing a luminous enamel comprising a luminous sulfide base pigment and a frit of the following composition:

| | Mols. |
|---|---|
| Alkali metal oxide | 0.03–0.5 |
| Earth alkali metal oxide | 0.05–0.25 |
| ZnO | 0.35–0.60 |
| $Al_2O_3$ | 0 –0.1 |
| $SiO_2$ | 0.25–1.0 |
| $F_2$ | 0 –0.2 |
| $B_2O_3$ | 0.15–1.2 |

6. A composition for prodcing a luminous enamel comprising a luminous sulfide base pigment and a frit of the following composition:

| | Mols. |
|---|---|
| Lithium oxide | 0.10–0.25 |
| Earth alkali metal oxide | 0.05–0.25 |
| ZnO | 0.35–0.60 |
| $Al_2O_3$ | 0 –0.1 |
| $SiO_2$ | 0.25–1.0 |
| $F_2$ | 0 –0.2 |
| $B_2O_3$ | 0.15–1.2 |

7. An enamel formed from a frit having a melting point below 850° C. and containing a luminous sulfide base pigment, said enamel being substantially free of iron, nickel, cobalt and lead.

8. An enamel formed from a frit having a melting point below 850° C. and containing a luminous sulfide base pigment, said frit being substantially free of iron, nickel, cobalt and lead, and containing an alkali metal compound and lithium oxide.

WALTER KERSTAN.
HEINRICH DIEHL.
WILHELM DESEKE.